US010997271B2

(12) United States Patent
Shetty (10) Patent No.: US 10,997,271 B2
(45) Date of Patent: May 4, 2021

(54) VARIABLE ELIMINATION TO IMPROVE SOLVER EFFICIENCY (71) Applicant: Halliburton Energy Services, Inc., Houston, TX (US)

(72) Inventor: Dinesh Ananda Shetty, Sugarland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 185 days.

(21) Appl. No.: 16/337,866

(22) PCT Filed: Nov. 29, 2016

(86) PCT No.: PCT/US2016/063993
§ 371 (c)(1),
(2) Date: Mar. 28, 2019

(87) PCT Pub. No.: WO2018/101913
PCT Pub. Date: Jun. 7, 2018

(65) Prior Publication Data
US 2020/0026744 A1 Jan. 23, 2020

(51) Int. Cl.
*G06F 17/12* (2006.01)
*G06F 17/16* (2006.01)
(Continued)

(52) U.S. Cl.
CPC .............. *G06F 17/12* (2013.01); *G06F 17/16* (2013.01); *G06F 17/175* (2013.01); *G06F 30/20* (2020.01); *G06F 2111/10* (2020.01)

(58) Field of Classification Search
CPC ......... G06F 17/12; G06F 17/16; G06F 17/175
See application file for complete search history.

(56) References Cited

U.S. PATENT DOCUMENTS 6,876,959 B1 4/2005 Peirce et al.
2005/0071404 A1* 3/2005 Nutter .................. G06F 17/16
708/446

(Continued)

FOREIGN PATENT DOCUMENTS

WO 2016080983 A1 5/2016
WO 2016080987 A1 5/2016
WO 2016080988 A1 5/2016

OTHER PUBLICATIONS

PCT International Application Serial No. PCT/US2016/063993, International Search Report dated Aug. 29, 2017, 3 pages.
PCT nternational Application Serial No. PCT/US2016/063993, Written Opinion dated Aug. 29, 2017, 8 pages.

(Continued)

*Primary Examiner* — Michael D. Yaary
(74) *Attorney, Agent, or Firm* — Gilliam IP PLLC (57) ABSTRACT To improve efficiency for solving a system of equations, art equation solver uses variable reduction techniques to reduce a number of variables to be solved. The equation solver identifies derived variables and eliminates them from the system of equations. The equation solver considers the remaining variables to be primitive variables. The primitive variables may be rewritten into a representation of the system of equations or into a set of equations that may be used to solve for values of the primitive variables. The equation solver solves for values of the primitive variables. Prior to solving or during solving iterations, the equation solver may apply storage policies to further reduce the number of variables to be solved. The storage policies indicate parameters and techniques for eliminating primitive variables to be solved, such as primitive variables that are insignificant (i.e., have little effect on a solution for the system of equations).

20 Claims, 5 Drawing Sheets (51) Int. Cl.
  *G06F 17/17* (2006.01)
  *G06F 30/20* (2020.01)
  *G06F 111/10* (2020.01)

(56) References Cited

U.S. PATENT DOCUMENTS

| | | |
|---|---|---|
| 2006/0129366 A1 | 6/2006 | Shaw |
| 2006/0235667 A1 | 10/2006 | Fung et al. |
| 2007/0255779 A1 | 11/2007 | Watts, III |
| 2008/0133186 A1 | 6/2008 | Li et al. |
| 2012/0158380 A1 | 6/2012 | Hajibeygi et al. |
| 2015/0066462 A1 | 3/2015 | Shetty et al. |
| 2015/0066463 A1* | 3/2015 | Shetty .................. G06G 7/32 703/10 |
| 2016/0259868 A1* | 9/2016 | Wang .................. E21B 43/20 |

OTHER PUBLICATIONS

Chen, "A primitive variable, strongly implicit calculation procedure for two and three-dimensional unsteady viscous flows: Applications to compressible and incompressible flows including flows with free surfaces", Retrospective Theses and Dissertations, pp. 1-231, 1990 [online] Retrieved on Feb. 5, 2019 from <http://lib.dr.iastate.edu/rtd/index.64.html#year_1990>.

Bai, et al., "Tightly Coupled Fluid-Structure Interaction Computational Algorithm for Hydraulic Fracturing Simulations", American Rock Mechanics Association, 48th US Rock Mechanics, Geomechanics Symposium, Jun. 1-4, 2014, Minneapolis, MN, 2014, 12 pages.

Weng, et al., "Modeling of Hydraulic-Fracture-Network Propagation in a Naturally Fractured Formation", Society of Petroleum Engineers Production & Operations, SPE Hydraulic Fracturing Technology Conference, Jan. 24-26, 2011,The Woodlands, TX, Nov. 2011, pp. 368-380.

* cited by examiner

VARIABLE ELIMINATION TO IMPROVE SOLVER EFFICIENCY

BACKGROUND

The disclosure generally relates to the field of data processing, and more particularly to arithmetic processing and calculating.

An amount of computational resources required to solve a system of equations increases as the number of variables within the system increases. In some fields, such as hydraulic fracturing simulation, there may be thousands of variables, particularly in complex dynamic fracture networks where hundreds of fractures are interacting with each other via junctions. Use of efficient solver algorithms can reduce overall computational time but still require a significant amount of other resources, such as memory.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without these specific details. For instance, this disclosure refers to hydraulic fracture simulation in illustrative examples. Aspects of this disclosure can be also applied to statistical analysis, big data analysis, and other computationally intensive tasks. In other instances, well-known instruction instances, protocols, structures and techniques have not been shown in detail in order not to obfuscate the description.

Terminology

Described below are two classifications of variables: derived variables and primitive variables. Derived variables are variables whose values may be derived from primitive variables; the derived variable values are dependent on the values of primitive variables. As a result, a system of equations may be simplified by eliminating derived variables and determining a representation of the system of equations using primitive variables. The representation of a system of equations may be a linear or non-linear representation comprising primitive variables or a set of equations which may be used to solve for primitive variable values.

INTRODUCTION

Solving large, multi-variable systems of equations can consume a large amount of computational resources, such as memory and processing time. For example, simulation of hydraulic fracturing can be a computationally expensive task. The large size of the area being treated, the number of wellbores involved in the treatment and the number of different types of fluids and proppants utilized in the treatment can significantly increase the problem size, making it impossible to obtain high fidelity simulation result in a timely manner using reasonable computational hardware. Thus, an efficient solver is needed to reduce an amount of computational resources required.

Overview

To improve efficiency for solving a system of equations, an equation solver uses variable reduction techniques to reduce a number of variables to be solved. The equation solver identifies derived variables and eliminates them from the system of equations. The equation solver considers the remaining variables to be primitive variables. The primitive variables may be rewritten into a representation of the system of equations or into a set of equations that may be used to solve for values of the primitive variables. The equation solver solves for values of the primitive variables. Prior to solving or during solving iterations, the equation solver may apply storage policies to further reduce the number of variables to be solved. The storage policies indicate parameters and techniques for eliminating primitive variables to be solved, such as primitive variables that are insignificant (i.e., have little effect on a solution for the system of equations). Eliminating variables allows for a system of equations to be solved using less memory and can reduce computational time. Furthermore, eliminating variables improves a condition number for a system of equations, thereby improving the chances of determining a solution for the system.

Example Illustrations

Figure 1:
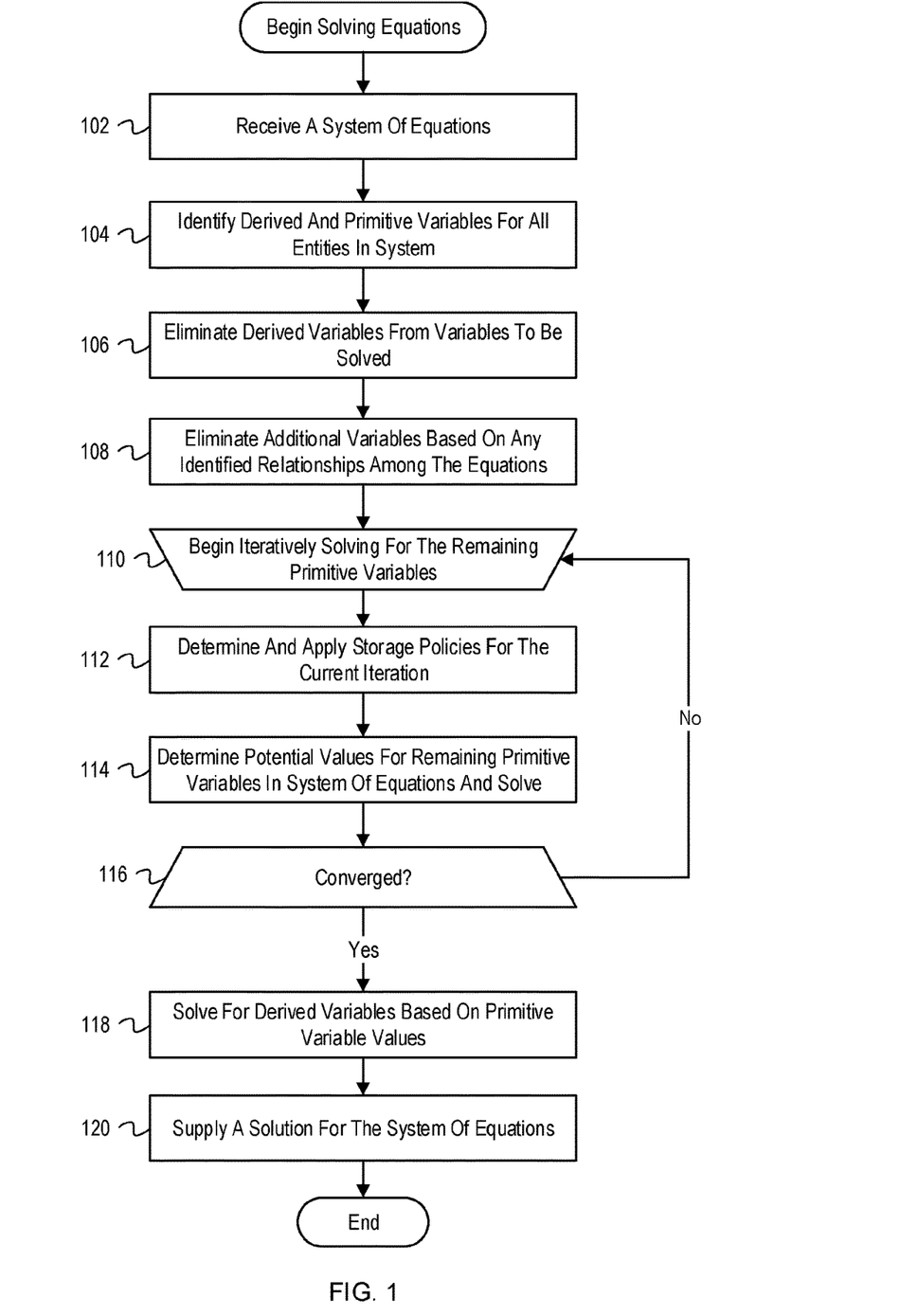
FIG. 1 depicts example operations for efficiently solving a system of equations.

FIG. 1 depicts example operations for efficiently solving a system of equations. FIG. 1 describes an equation solver as performing the operations even though identification of program code can vary by developer, language, platform, etc.

The equation solver ("solver") receives a system of equations to be solved (102). The system of equations may relate to a variety of problems to be solved or analyzed. For example, as described in FIGS. 2 and 3, the system of equations may relate to the simulation and modeling of a hydraulic fracturing operation. However, the system of equations may relate to other fields such as financial predictions and analysis, data analysis, etc. The solver may receive the equations through a configuration file or as input from a user. The solver may parse the inputs to identify different variables, operands, terms, parameters, etc., in the system of equations.

The solver identifies primitive and derived variables in the system of equations (104). Derived variables are variables that can be expressed in terms of primitive variables. In other words, the value of a derived variable can be determined using values of one or more primitive variables. The solver identifies the derived variables by analyzing the system of equations with the equations in an implicit form. The solver then identifies the variables that do not have any spatial gradients in implicit form as the derived variables. The remaining variables (the variables which do have spatial gradients) are then considered the primitive variables. In some implementations, the solver may create a local block matrix system based on the system of equations. The solver can then analyze the matrix system to identify entries that do not have dependency on the neighboring matrices as the derived variables. An example of identifying derived and primitive variables using a local block matrix system is described in FIG. 2. In other implementations, the derived and primitive variables can be identified through orthogonal transformation techniques, such as principle component analysis.

The solver eliminates derived variables from variables to be solved (106). Since values of the derived variables may be determined based on primitive variable values, the solver reduces the number of variables in the system of equations by eliminating the derived variables. Reducing the number of variables allows the solver to more efficiently use resources like memory when solving the system of equations. As part of eliminating the derived variables, the solver generates a representation of the system of equations based on the remaining primitive variables. Eliminating the derived variables also improves a condition number for the system of equations. The condition number indicates the sensitivity of a function in response to changes or errors in an input. Thus, decreasing the number of variables improves stability of the system of equations and improves the chances of determining a solution.

To further reduce variables to be solved, tire solver eliminates additional variables based on any identified relationships among the system of equations (108). The system of equations may include equations relating to various entities. For example, as described in FIG. 4, the system of equations may include variables for describing a reservoir, a rock formation, and a fracture. There may be relationships among the entities such that variables for a first entity may be described in terms of primitive variables of a second entity. By identifying these relationships, the solver can eliminate the variables from the first entity which can later be determined as needed based on the primitive variables of the second entity. Stated differently, the primitive variables for a first entity described by a first system of equations may be considered derived variables for a second entity described by a second system of equations. As a result, solving for the primitive variables of the second entity allows values of the primitive variables for the first entity to be determined.

The solver begins iteratively solving for the remaining primitive variables (110). The solver uses iterative techniques to determine values for tire primitive variables, such as Newton method, stationary iterative methods, attractive fixed points, heuristic-based techniques, or other techniques for generating approximate solutions to a system of equations. Tire solver continues iterating until values for the primitive variables converge. In some implementations, direct, rather than iterative, techniques may be used to solve for the primitive variables. For example, direct techniques may be used with a linear system of equations or with non-linear systems on which a linearization technique has been applied.

The solver determines and applies storage policies (112). Policies indicate techniques or parameters for eliminating or retaining variables. Solving a system of equations frequently results in long linear representations that increase memory usage and computational time associated with arithmetic operations for a system executing the solver. Thus, the solver can dynamically determine for each iteration winch variables to maintain and eliminate unnecessary variables to further improve efficiency of solving the system of equations. The solver may receive policies through a configuration file or from user input. Tire storage policies may identify parameters (e.g., threshold values, coefficient weights) and techniques for variable retention and elimination. For example, a storage policy may indicate that only variables that are heavily weighted (i.e. have a large coefficient value) should be retained through different iterations. Therefore, variables that are not heavily weighted are eliminated from a linear representation or consolidated into a constant variable whose value is maintained through iterations. Eliminating a variable or consolidating variable values into a constant allows memory space previously occupied by the variable to be freed. Additionally, eliminating a variable reduces computational time As an additional example, a storage policy may indicate that only dominant variables be maintained throughout each iteration. The solver can identify a dominant variable by determining a degree with which changing the value of the variable affects the outcome of a solution. The storage policy may include a threshold for how much a solution should change in result to a change in the variable for the variable to be considered dominant. For example, a threshold may indicate that raising the value of a variable by 50% should result in a change in value of a solution by at least 25%. If the threshold is not met, then the variable is not considered dominant and is eliminated from primitive variables to be solved or an approximated value is maintained for the variable within an iteration.

The solver determines potential values for the remaining primitive variables in the system of equations and solves a representation of the system based on the values (114). The remaining primitive variables are those who have not been eliminated based on entity relationships or by a storage policy. The solver approximates values for these variables using the specified iterative technique and based on the approximated values for the previous iteration. The solver then determines a solution for the representation of the system based on the approximated primitive variable values.

Tire solver determines whether the solution based on tire primitive variable values has converged (116). The solver may be configured with termination criteria that indicates a threshold for how near an approximated solution must be to expected values or limits for a solution for the solution to be considered convergent. For example, the termination criteria may indicate that the iterations should cease once the approximated solution is within 2% of the expected value. In some implementations, the termination criteria may indicate that the iterations should cease once the approximated solution fails to vary more than specified percentage through a specified number of iterations (e.g. if the solution fails to vary more than 1% through 10 iterations). If the solution based on the primitive variable values is not considered convergent, then the solver performs another iteration.

If convergence has been reached, the solver solves for derived variables based on the determined primitive variable values (118). The solver may rewrite equations in tire system of equations to express the derived variables in terms of the primitive variables. The solver then uses the determined primitive variable values to solve for the derived variables. The solver can supply tire variable values to an application or other process which may perform additional computations based on the values or supply the values to a user.

Tire solver supplies a solution for the system of equations (120). The solver determines a solution based on the determined values of the derived variables and the primitive variables. The solver may supply the solution to another component or software application for additional processing. For example, as described below, the solver may supply the solution for generation of a hydraulic fracturing model or simulation. In some implementations, such as a real time drilling operation, the solver may supply the solution to hardware which modifies parameters, such as drill speed, based on the determined solution.

Figure 2:
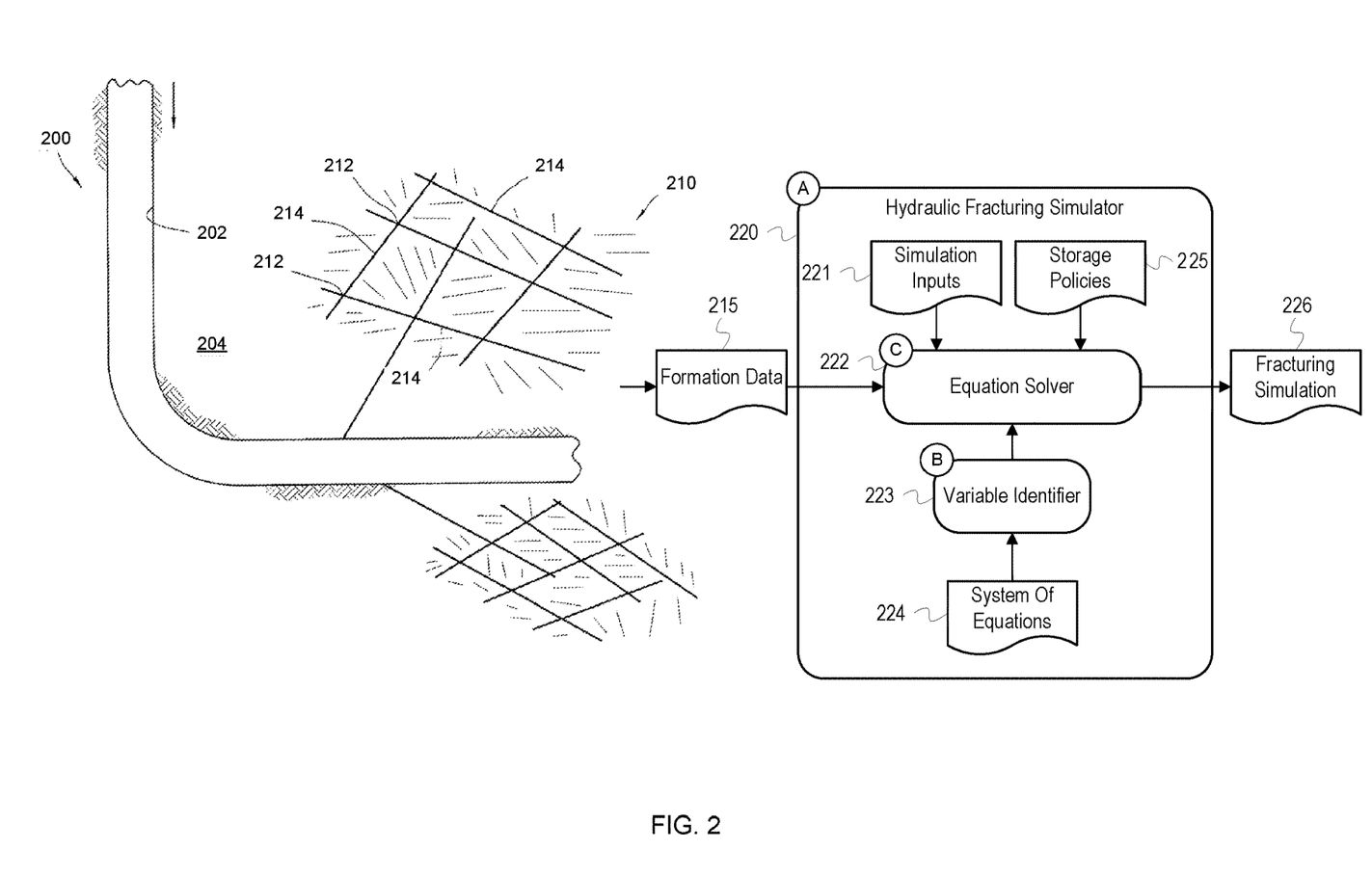
FIG. 2 depicts an example hydraulic fracturing simulator with an efficient equation solver.
Figure 3:
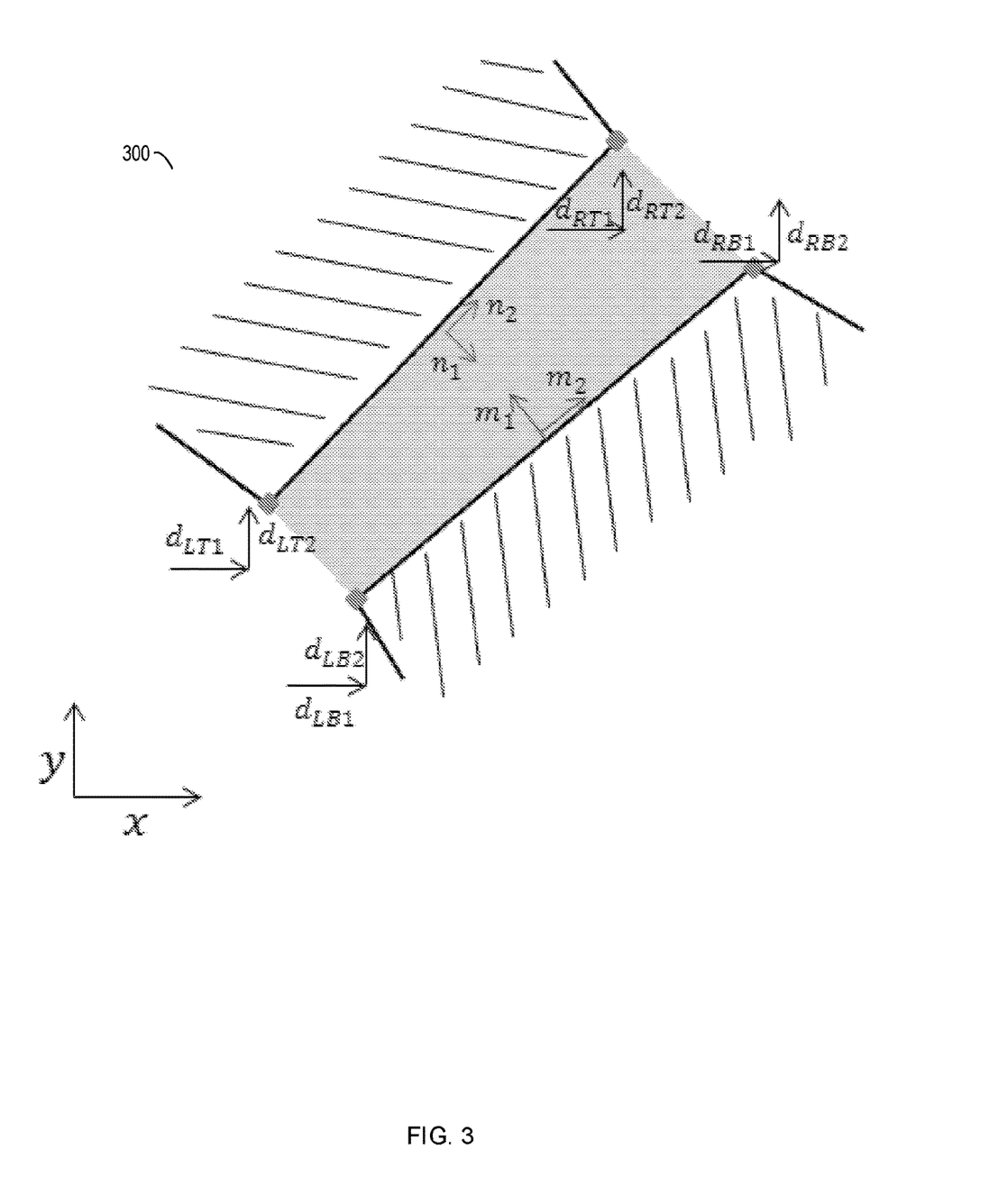
FIG. 3 depicts an example fracture within a fracture system.

FIGS. 2 and 3 describe applying tire efficient solving technique described in the operations of FIG. 1 to hydraulic fracturing simulation. Hydraulic fracturing simulation is one example application for using derived variable elimination and storage policies to reduce memory consumption and computational tune when solving a system of equations.

FIG. 2 depicts an example hydraulic fracturing simulator with an efficient equation solver. The example hydraulic fracturing simulator may be used to construct the dynamic fracture network model and to simulate proppant flows through a dynamic fracture network via the model. FIG. 2 includes a hydraulic fracturing simulator 220 that comprises an equation solver 222 and a variable identifier 223. FIG. 2 also depicts an example hydrocarbon production system 200 for which a simulation is to be produced. The hydrocarbon production system 200 (comprises a wellbore 202 extending through a formation 204, with at least one fracture network 210 within the formation 204 and connected to the wellbore 202. The formation 204 may comprise any subterranean geological formation suitable for fracturing, e.g., shale and/or any other formation having a low permeability.

At stage A, the hydraulic fracturing simulator 220 receives inputs for performing a fracturing simulation including formation data 215, simulation inputs 221, a system of equations 224, and storage policies 225. The formation data 215 is a representation of the formation 204 that may be determined using microseismic measurements or other geological imaging techniques. The formation data 215 includes the apertures and the dimensions of the fractures in the fracture network 210 as well as dimensions for the plurality of junctions 212 and the plurality of fractures 214 (or "flow paths") within the fracture network 210. The formation data 215 may be used by the hydraulic fracturing simulator 220 to construct a fracture network model. For ease of illustration, the formation 204 shown by example in FIG. 2 depicts the fracture network 210 with a relatively low number of junctions 212 and fractures 214. In some instances, the fracture network 210 may comprise in the order of thousands of fractures to tens of thousands of fractures.

The simulation inputs 221 includes inputs and parameters to be used in performing the simulation. The inputs may include a type fracturing process to be simulated (e.g. simultaneous fracturing, zipper fracturing), types of fluids to be used, types of proppants, amount of fluid, etc. The parameters of the simulation may include a duration of the simulation, a specified formation to be simulated, thresholds for specified variables, etc. Furthermore, inputs may include distribution of natural fractures in treatment domain, wellbore geometries, details of well completion, properties for the rock, initial conditions (such as rock stress, formation pressure, etc.), and treatment details (e.g., pumping schedule).

The storage policies 225 indicate parameters and techniques for controlling processor and memory consumption while the equation solver 222 solves the system of equations 224. A storage policy may indicate parameters for variable retention for each iteration of solving equations, such as thresholds for coefficient weights, variance of an approximated variable value, etc. For example, a storage policy may indicate that a variable should be eliminated if its coefficient value is below a threshold. The threshold may change during iterations based on an amount of available memory on the system executing the equation solver 222. The storage policies may also identify important variables that should be retained regardless of the indicated parameters. For example, a storage may indicate that some variables should be retained to maintain fluid-solid coupling.

The system of equations 224 includes equations or algorithms to be used during simulation. The governing equations for wellbore and fracture flows may include the Navier-Stokes equations or its simplifications, such as Reynolds (or Stoke's) approximations which are relevant for low Reynolds number flows. However, any suitable system or set of equations may be used. For example, the following 2-dimensional time-dependent governing equations for the flow inside the fractures may be used:

Continuity equation: $\frac{\partial A\rho}{\partial t} + \frac{\partial \dot{m}}{\partial x} = 0$ (1)

Momentum equation: (2)

$\frac{\partial \dot{m}}{\partial t} + \frac{\partial \dot{m}^2/(\rho A)}{\partial x} + AP_x - \frac{\partial}{\partial x}\mu\frac{\partial \dot{m}/\rho}{\partial x} + F_p = 0$ Proppant equation: $\frac{\partial A\phi}{\partial t} + \frac{\partial \phi \dot{m}/\rho}{\partial x} = 0$ (3)

Density model: $\rho(\phi) = \rho_p \phi + \rho_b(1-\phi)$ (4)

Viscosity model: $\mu(\phi) = \mu_b\left(1 - \frac{\phi}{\phi_c^\mu}\right)^{-1.8}$ (5)

Area model: $A = A_L\left(1 - \frac{x}{L}\right) + A_R\left(\frac{x}{L}\right)$ (6)

The hydraulic fracturing simulator 220 passes the formation data 215, the simulation inputs 221, and the storage policies 225 to the equation solver 222. The system of equations 224 is passed to and analyzed by the variable identifier 223.

At stage B, the variable identifier 223 analyzes the system of equations 224 to identify derived and primitive variables. In some embodiments, the variable identifier 223 identifies derived variables by analyzing the system of equations 224 and determining the derived variables to be those that do not have any spatial derivatives $\left(\text{e.g., } \frac{\partial \dot{m}}{\partial x}\right)$ in implicit form. Conversely, the variable identifier 223 may identify primitive variables by identifying variables that do have spatial derivatives in implicit form. For example, in the equations 1-6 identified above, the first three equations have spatial derivatives; thus, the pressure ($\varphi$, mass flux ($\dot{m}$) and fluid to proppant ration ($\phi$) are the primitive variables, and density, viscosity and area form the derived variables.

In some embodiments, variable types may be determined by generating a block matrix system. The variables that do not have dependency on the neighboring matrices are the derived variables. For example, the following block matrix system was constructed based on the equations 1-6 above:

$$\begin{bmatrix} -a_1 & 0 & 0 & 0 & 0 & 0 \\ f_1 & f_2 & 0 & f_3 & 0 & 0 \\ g_1 & 0 & -c_2 & g_3 & g_4 & g_5 \\ 0 & 0 & 0 & 0 & 0 & 0 \\ 0 & 0 & 0 & 0 & 0 & 0 \\ 0 & 0 & 0 & 0 & 0 & 0 \end{bmatrix} \begin{pmatrix} \dot{m} \\ \phi \\ p \\ \rho \\ \mu \\ A \end{pmatrix}_{i-1} + \begin{bmatrix} a_1 & 0 & 0 & a_2 & 0 & 0 \\ b_1 & b_2 & 0 & b_3 & 0 & 0 \\ c_1 & 0 & c_2 & c_3 & c_4 & c_5 \\ 0 & d_1 & 0 & 1 & 0 & 0 \\ 0 & e_1 & 0 & 0 & 1 & 0 \\ 0 & 0 & 0 & 0 & 0 & 1 \end{bmatrix}$$

$$\begin{pmatrix} \dot{m} \\ \phi \\ p \\ \rho \\ \mu \\ A \end{pmatrix}_i + \begin{bmatrix} 0 & 0 & 0 & 0 & 0 & 0 \\ l_2 & l_2 & 0 & l_3 & 0 & b_4 \\ m_1 & 0 & 0 & m_3 & m & m_5 \\ 0 & 0 & 0 & 0 & 0 & 0 \\ 0 & 0 & 0 & 0 & 0 & 0 \\ 0 & 0 & 0 & 0 & 0 & 0 \end{bmatrix} \begin{pmatrix} \dot{m} \\ \phi \\ p \\ \rho \\ \mu \\ A \end{pmatrix}_{i+1} = \begin{pmatrix} f_1 \\ f_2 \\ f_3 \\ f_4 \\ f_5 \\ f_6 \end{pmatrix}$$

Based on identifying variables with dependencies on other matrices, it can again be determined that the pressure (ρ), mass flux (ṁ) and fluid to proppant ratio (ϕ) are the primitive variables. After determining the types of the variables, the variable identifier 223 identifies the primitive and derived variables in the system of equations 224 to the equation solver 222.

At stage C, the equation solver 222 produces a fracturing simulation 226 based on the received inputs. The equation solver 222 populates equations in the system of equations 224 for solving the identified primitive variables with inputs from the formation data 215 and the simulation inputs 221. Additionally, the equation solver 222 may rewrite equations in the system of equations 224 or determine a representation of the system of equations 224 based on the identified primitive variables. For example, a linear representation of an internal fracture in the fracture network 210 may be expressed as follows:

$$v_{f,i} = C + a_1 P_L + a_2 P_R + a_3 d_{LT1} + a_4 d_{LB1} + a_5 d_{LT1} + a_6 d_{LT2} + a_4 d_{RT1} + a_4 d_{RB1} + a_6 d_{RT1} + a_7 d_{RT2} + \Sigma_0^M \alpha_i \phi_i + \Sigma_0^N \beta_i \psi_i \quad (7)$$

The example representation is based on the fracture 300 depicted in FIG. 3. The representation includes variables for pressure (P), volume or mass fraction of proppant (ϕ), volume or mass fraction of fluids (ψ), and displacement (d). The subscripts for the displacement variables indicate locations within the fracture 300 (e.g. LT1 indicates the x-axis displacement in the top left corner). The variables N and M represent number of fluids and proppants, respectively.

The equation solver 222 iteratively solves the representation until a solution for the representation indicates convergence. For example, an approximate or expected outcome of the representation may be identified, and the equation solver 222 iteratively adjusts variable values until a solution approaching the expected outcome is reached. During the iterations, the equation solver 222 applies the storage policies 225 to control memory usage and processor load required to perform the calculations. A storage policy in the storage policies 225 may indicate that dominant variables should be retained throughout iterations and that insignificant variables should be consolidated into a constant value. Dominant variables may be specified by variable type (e.g., pressure, displacement, etc.) or based on a threshold coefficient weight (e.g., a coefficient larger than 5). As an example, if the policy indicates that pressure is a dominant variable, the above representation (equation 7) may be simplified to the following:

$$v_{f,i} = K_1 + a_1 P_L + a_2 P_R \quad (8)$$

where $K_1 = C + a_3 d_{LT1} + a_4 d_{LB1} + a_5 d_{LT1} + a_6 d_{LT2} + a_4 d_{RT1} + a_4 d_{RB1} + a_6 d_{RT1} + a_7 d_{RT2} + \Sigma_0^M \alpha_i \phi_i + \Sigma_0^N \beta_i \psi_i$ Values for the eliminated primitive variables may be approximated based on values of previous iterations or other inputs so that a value for the constant $K_1$ can be determined and maintained throughout the iterations.

After solving for values of the primitive variables, the equation solver 222 uses the values of the primitive variables to solve for derived variable values and may perform further calculations to generate a solution to the system of equations 224. The equation solver 222 outputs the fracturing simulation 226 based on the solved system of equations 224. Another component in the hydraulic fracturing simulator 220 may first generate a model or other representation of the simulation based on the solved variables.

Figure 4:
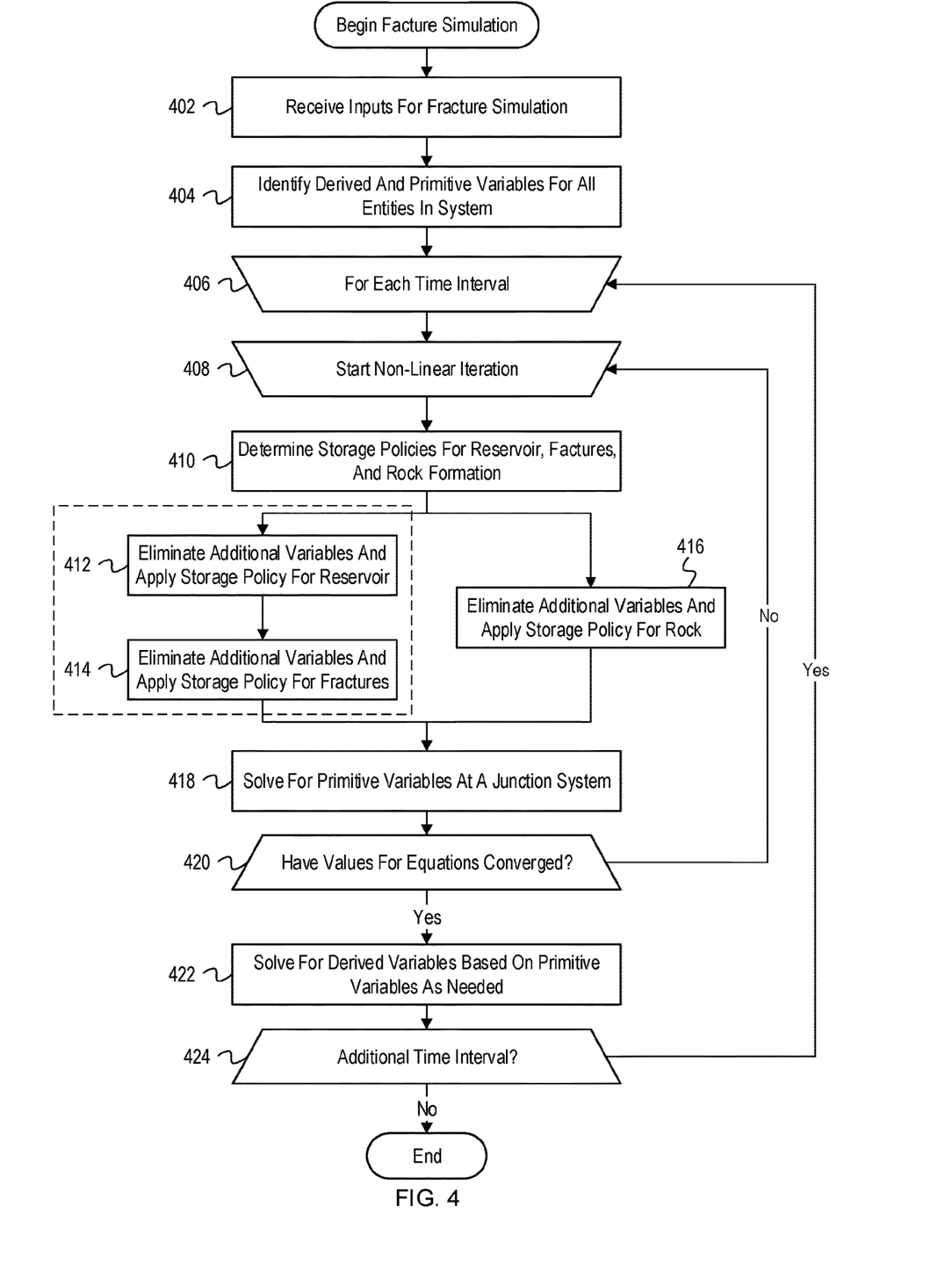
FIG. 4 depicts a flowchart with example operations for efficiently solving equations for a fracturing simulation.

FIG. 4 depicts a flowchart with example operations for efficiently solving equations for a fracturing simulation. FIG. 4 refers to a hydraulic fracturing simulator similar to the hydraulic fracturing simulator 220 described in FIG. 2 as performing the operations even though identification of program code can vary by developer, language, platform, etc.

A hydraulic fracturing simulator ("simulator") receives inputs for performing a fracture simulation for a system (402). The inputs can include a system of equations, proppant and fluid types and ratios, fluid pressure, wellbore dimensions, rock formation and fracture dimensions, simulation times, etc.

The simulator identifies derived and primitive variables in the system of equations for all entities in the system (404). In this example, the entities include a rock formation, a reservoir, a fracture formation, and a junction. The simulator identifies derived and primitive variables using the techniques described above.

The simulator begins solving the system of equations for a series of times (406). The fracturing simulation demonstrates fluid and proppant flow over a period of time, so the simulator solves the system of equations for a number of points in time within the period. The number of times within the period can vary based on a desired granularity of the simulation and an amount of available computational resources. The time for which the system of equations are currently being solved is hereinafter referred to as "the current time."

The simulator starts a non-linear iteration for solving the system of equations for the current time (408). As described in FIG. 1, the simulator may use a variety of iterative techniques to determine approximate solutions for the primitive variables. The iterations continue until convergence is achieved.

The simulator determines storage policies for entities in the system (410). Storage policies may apply to all entities in a system, and some storage policies may apply to specific entities. For example, a storage policy may apply specifically to equations for a fracture formation and indicate specific variables to be retained through the iterations.

The simulator eliminates derived variables and applies a storage policy for the reservoir (412), and then the simulator eliminates derived variables and applies a storage policy for the fractures (414). The simulator simplifies the system of equations by eliminating the derived variables and may rewrite the equations as a linear representation based on the primitive variables. The dashed square around blocks 412 and 414 indicate that there is a relationship between these two entities. Specifically, the relationship allows for the reservoir to be written as a linear function of the fracture primitive variables. Thus, the primitive variables of the reservoir entity become derived variables of the fracture entity, so additional variables may be eliminated based on the relationship.

The simulator eliminates derived variables and applies a storage policy for the rock formation (416). The identified derived variables for the rock formation entity are eliminated and a linear representation of the rock formation may be determined based on the remaining primitive variables.

After eliminating variables for each of the entities, the simulator solves for primitive variables at the junction (418). Similar to the relationship between the reservoir and the fracture formation, there are relationships between the fracture formation and the junction and the rock formation and the junction that allow for further variable elimination. In other words, the fracture formation and the rock formation can be rewritten as a linear function of the junction's primitive variables.

The simulator determines whether a solution based on the primitive variable values has converged (420). If the solution is approaching an expected outcome or if other termination criteria has been satisfied, the simulator determines that convergence has been reached. Otherwise, the simulator performs another iteration.

The simulator solves for the derived variables based on the primitive variable values as needed (422). The simulator can determine which derived variable values are needed based on a specified configuration or a type of simulation being performed. The simulator then solves for the necessary derived variables based on the primitive variable values for the current time.

The simulator determines whether there is an additional time interval to be simulated (424). If there is not an additional time interval, the process of solving a system of equations ends and the simulator outputs the variable values that have been determined. The values may be used by the simulator to generate models or other representations of a fracturing simulation Variations The flowcharts are provided to aid in understanding the illustrations and are not to be used to limit scope of the claims. The flowcharts depict example operations that can vary within the scope of the claims. Additional operations may be performed, fewer operations may be performed; the operations may be performed in parallel, and the operations may be performed in a different order. For example, the operation depicted in blocks 104 and 106 of FIG. 1 can be performed in parallel or concurrently. Additionally, the operations depicted in block 108 of FIG. 1 may not be performed. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The flowcharts depict iterative operations for determining variable values. Different techniques may be applied for iteratively determining variable values. As a result, the number of iterations for loop operations may vary. Different techniques may require fewer iterations or more iterations. Additionally, the application of different processing techniques, such as parallel processing or hyper threading, may reduce the number of iterations.

The examples often refer to an "equation solver." The equation solver is a construct used to refer to implementation of functionality for efficiently solving a system of equations. This construct is utilized since numerous implementations are possible. A equation solver may be a particular component or components of a machine (e.g., a particular circuit card enclosed in a housing with other circuit cards/boards), machine-executable program or programs (e.g., a simulator, data analysis software), firmware, a circuit card with circuitry configured and programmed with firmware for efficiently solving a set of equations, etc. The term is used to efficiently explain content of the disclosure. The equation solver can also be referred to as an algorithm solver. Although the examples refer to operations being performed by an equation solver, different entities can perform different operations. For instance, a dedicated co-processor or application specific integrated circuit can identify derived and primitive variables.

The variations described above do not encompass all possible variations, implementations, or embodiments of the present disclosure. Other variations, modifications, additions, and improvements are possible.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like, a dynamic programming language such as Python, a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
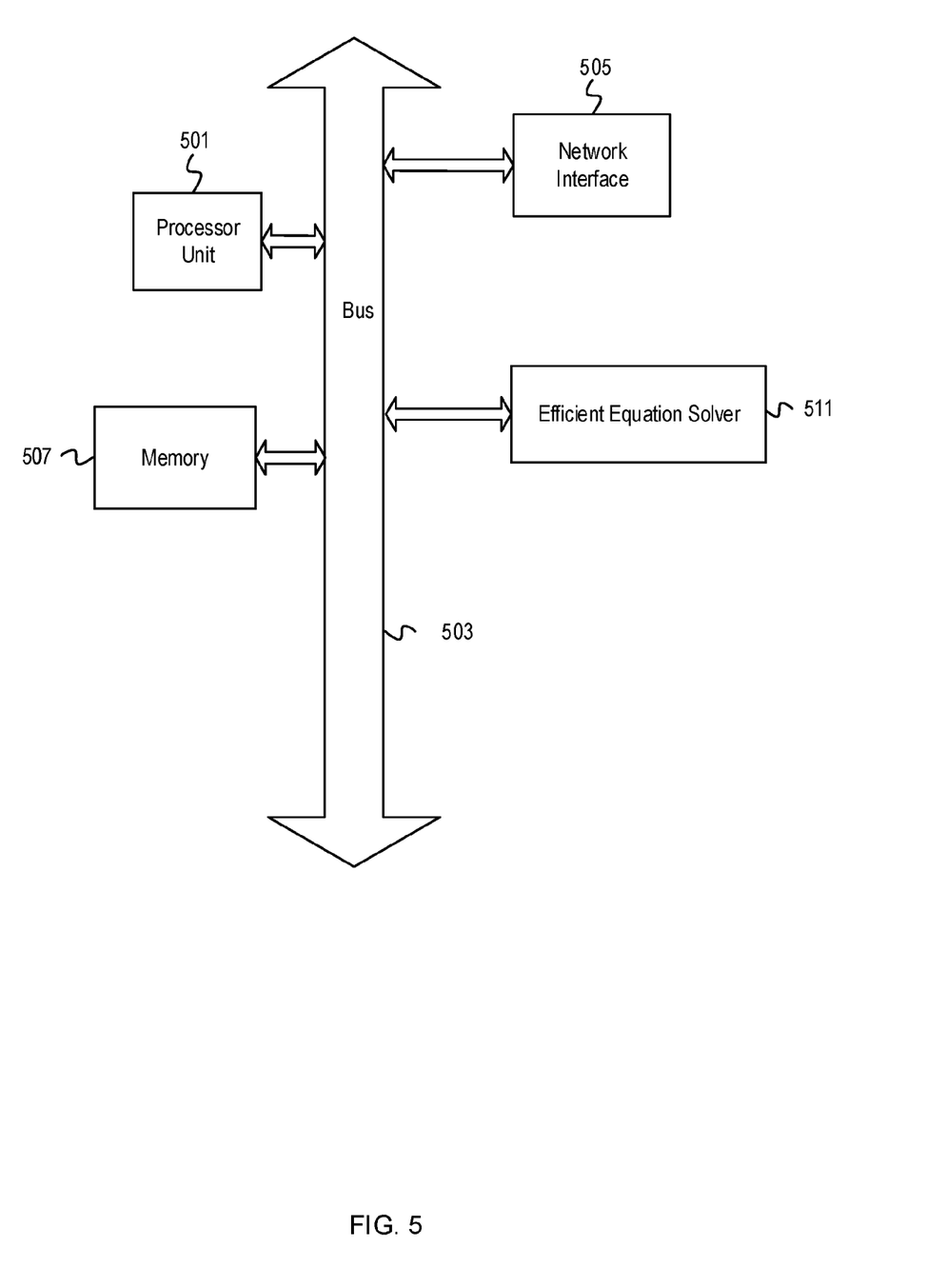
FIG. 5 depicts an example computer system with an efficient equation solver.

FIG. 5 depicts an example computer system with an efficient equation solver. The computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, Hyper-Transport® bus, InfiniBand® bus, NuBus, etc.) and a network interface 505 (e.g., a Fiber Channel interface, an Ethernet interface, an internet small computer system interface. SONET interface, wireless interface, etc.). The system also includes an efficient equation solver 511. The efficient equation solver 511 eliminates derived variables and applies variable storage policies to reduce memory usage and computational time for solving a system of equations. Any one of the previously described functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor unit 501.

While the aspects of the disclosure are described with reference to various implementations and exploitations, it will be understood that these aspects are illustrative and that the scope of the claims is not limited to them. In general, techniques for efficiently solving a system of equations as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Embodiments generally include a method that comprises identifying a set of derived variables from a plurality of variables within a system of equations. The method further includes determining a representation of the system of equations based, at least in part, on a set of primitive variables. The set of primitive variables comprises variables of the plurality of variables not within the set of derived variables. The method further includes iteratively solving the representation of the system of equations. Iteratively solving the representation comprises, for at least one iteration, determining that a first variable within the representation should be eliminated from the representation based, at least in part, on a first policy and eliminating the first variable from the representation.

In some embodiments, identifying the set of derived variables from the plurality of variables within the system of equations comprises identifying variables in the system of equations that do not have spatial derivatives.

In some embodiments, identifying the set of derived variables from the plurality of variables within the system of equations comprises generating a block matrix system based, at least in part, on the system of equations and identifying variables which do not depend on adjacent matrices in the block matrix system as the set of derived variables.

In some embodiments, eliminating the first variable from the representation comprises adding an approximate value for the first variable to a constant in the representation and freeing up memory space occupied by the first variable on a system which is solving the representation.

In some embodiments, determining that the first variable within the representation should be eliminated from the representation based, at least in part, on the first policy comprises monitoring an amount of available memory on a system which is solving the representation determining that the amount of available memory falling below a threshold. The threshold is indicated in the first policy.

In some embodiments, determining that the first variable within the representation should be eliminated from the representation based, at least in part, on the first policy comprises determining that a solution to the representation fails to change more than a threshold amount in response to a change in value of the first variable. The threshold amount is indicated in the first policy.

In some embodiments, the first policy indicates that variables with coefficients below a threshold should be eliminated from the representation.

Any of the example embodiments described above may be realized as a method, as program code on machine readable media, or as an apparatus. Additional embodiments can include varying combinations of features or elements from the example embodiments described above. For example, one embodiment may include elements from three of the example embodiments while another embodiment includes elements from five of the example embodiments described above.

What is claimed is:

1. A method for simulating downhole operations, said method comprising:
    parsing inputs to a simulation model comprising a system of equations to identify one or more derived variables from a plurality of variables within the system of equations, wherein the derived variables have values that are dependent on values of one or more primitive variables within the system of equations;
    generating a first representation of the system of equations that excludes the derived variables and includes the primitive variables; and
    iteratively solving the first representation of the system of equations while adjusting processing requirements for the system of equations, comprising:
        generating a second representation of the system of equations by eliminating a first primitive variable from the first representation based on a policy that associates a computer resources threshold with the first primitive variable;
        determining a solution based on values of the primitive variables within the second representation;
        determining whether the solution converges; and
        in response to determining that the solution converges, solving for at least one of the derived variables based on one or more of the primitive variable values.

2. The method of claim 1, wherein identifying the derived variables from the plurality of variables within the system of equations comprises identifying variables in the system of equations that do not have spatial derivatives.

3. The method of claim 1, wherein identifying the derived variables from the plurality of variables within the system of equations comprises:
    generating a block matrix system based, at least in part, on the system of equations; and
    identifying variables which do not depend on adjacent matrices in the block matrix system as the set of derived variables.

4. The method of claim 1, wherein eliminating the first primitive variable from the second representation comprises:
    adding an approximate value for the first primitive variable to a constant in the second representation; to
    free up memory space occupied by the first primitive variable on a system that is solving the first representation.

5. The method of claim 1, wherein determining that the first primitive variable within the first representation should be eliminated from the first representation based, at least in part, on the first policy comprises:
    monitoring an amount of available memory on a system that is solving the first representation; and
    determining that the amount of available memory is below a threshold;
    wherein the threshold is indicated in the first policy.

6. The method of claim 1, wherein determining that the first primitive variable within the first representation should be eliminated from the first representation based, at least in part, on the first policy comprises:
    determining that a solution to the first representation changes more less than a threshold amount in response to a change in value of the first primitive variable;
    wherein the threshold amount is indicated in the first policy.

7. The method of claim 1, wherein the first policy indicates that variables with coefficients below a threshold should be eliminated from the first representation.

8. One or more non-transitory machine-readable media comprising program code for solving a system of equations, the program code to:
    parse inputs to a simulation model comprising a system of equations to identify one or more derived variables from a plurality of variables within the system of equations, wherein the derived variables have values that are dependent on values of one or more primitive variables within the system of equations;
    generate a first representation of the system of equations that excludes the derived variables and includes primitive variables;
    iteratively solve the first representation of the system of equations while adjusting processing requirements for the system of equations, wherein the program code to iteratively solve the first representation comprises program code to,
        generate a second representation of the system of equations by eliminating a first primitive variable from the first representation based on a policy that associates a computer resources threshold with the first primitive variable;
        determine a solution based on values of the primitive variables within the second representation;
        determine whether the solution converges; and
        in response to determining that the solution converges, solve for at least one of the derived variables based on one or more of the primitive variable values.

9. The non-transitory machine-readable media of claim 8, wherein the program code to identify the derived variables from the plurality of variables within the system of equations comprises program code to identify variables in the system of equations that do not have spatial derivatives.

10. The non-transitory machine-readable media of claim 8, wherein the program code to identify the derived variables from the plurality of variables within the system of equations comprises program code to:
    generate a block matrix system based, at least in part, on the system of equations; and
    identify variables which do not depend on adjacent matrices in the block matrix system as the set of derived variables.

11. The non-transitory machine-readable media of claim 8, wherein the program code to eliminate the first primitive variable from the first representation comprises program code to:
    add an approximate value for the first primitive variable to a constant in the second representation to
    free up memory space occupied by the first primitive variable on a system that is solving the first representation.

12. The non-transitory machine-readable media of claim 8, wherein the program code to determine that the first primitive variable within the first representation should be eliminated from the first representation based, at least in part, on the first policy comprises program code to:
  monitor an amount of available memory on a system that is solving the first representation; and
  determine that the amount of available memory is below a threshold;
  wherein the threshold is indicated in the first policy.

13. The non-transitory machine-readable media of claim 8, wherein the program code to determine that the first primitive variable within the first representation should be eliminated from the first representation based, at least in part, on the first policy comprises program code to:
  determine that a solution to the first representation changes less than a threshold amount in response to a change in value of the first primitive variable;
  wherein the threshold amount is indicated in the first policy.

14. An apparatus comprising:
a processor; and
a non-transitory machine-readable medium having program code executable by the processor to cause the apparatus to,
  parse inputs to a simulation model comprising a system of equations to identify one or more derived variables from a plurality of variables within the system of equations, wherein the derived variables have values that are dependent on values of one or more primitive variables within the system of equations;
  generate a first representation of the system of equations that excludes the derived variables and includes the primitive variables; and
  iteratively solve the first representation of the system of equations while adjusting processing requirements for the system of equations, wherein the program code executable by the processor to cause the apparatus to iteratively solve the first representation comprises program code executable by the processor to cause the apparatus to,
    generate a second representation of the system of equations by eliminating a first primitive variable from the first representation based on a policy that associates a computer resources threshold with the first primitive variable;
    determine a solution based on values of the primitive variables within the second representation;
    determine whether the solution converges; and
    in response to determining that the solution converges, solve for at least one of the derived variables based on one or more of the primitive variable values.

15. The apparatus of claim 14, wherein the program code executable by the processor to cause the apparatus to identify the derived variables from the plurality of variables within the system of equations comprises program code executable by the processor to cause the apparatus to identify variables in the system of equations that do not have spatial derivatives.

16. The apparatus of claim 14, wherein the program code executable by the processor to cause the apparatus to identify the derived variables from the plurality of variables within the system of equations comprises program code executable by the processor to cause the apparatus to:
  generate a block matrix system based, at least in part, on the system of equations; and
  identify variables which do not depend on adjacent matrices in the block matrix system as the set of derived variables.

17. The apparatus of claim 14, wherein the program code executable by the processor to cause the apparatus to eliminate the first primitive variable from the first representation comprises program code executable by the processor to cause the apparatus to:
  add an approximate value for the first primitive variable to a constant in the second representation to
  free up memory space occupied by the first primitive variable on the apparatus.

18. The apparatus of claim 14, wherein the program code executable by the processor to cause the apparatus to determine that the first primitive variable within the first representation should be eliminated from the first representation based, at least in part, on the first policy comprises program code executable by the processor to cause the apparatus to:
  monitor an amount of available memory on a system that is solving the first representation; and
  determine that the amount of available memory is below a threshold;
  wherein the threshold is indicated in the first policy.

19. The apparatus of claim 14, wherein the program code executable by the processor to cause the apparatus to determine that the first primitive variable within the first representation should be eliminated from the first representation based, at least in part, on the first policy comprises program code executable by the processor to cause the apparatus to:
  determine that a solution to the first representation changes less than a threshold amount in response to a change in value of the first primitive variable;
  wherein the threshold amount is indicated in the first policy.

20. The apparatus of claim 14, wherein the first policy indicates that primitive variables with coefficients below a threshold should be eliminated from the first representation.

* * * * *

UNITED STATES PATENT AND TRADEMARK OFFICE
CERTIFICATE OF CORRECTION

PATENT NO. : 10,997,271 B2
APPLICATION NO. : 16/337866
DATED : May 4, 2021
INVENTOR(S) : Dinesh Ananda Shetty It is certified that error appears in the above-identified patent and that said Letters Patent is hereby corrected as shown below:

In the Specification

Column 4, Line 10, the portion reading -time- should read --time.--

Column 9, Line 38, the portion reading -simulation- should read --simulation.--

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*